United States Patent
Mores et al.

(10) Patent No.: US 10,737,766 B2
(45) Date of Patent: Aug. 11, 2020

(54) THRUST PRODUCING UNIT WITH AT LEAST TWO ROTOR ASSEMBLIES AND A SHROUDING

(71) Applicant: AIRBUS HELICOPTERS DEUTSCHLAND GMBH, Donauworth (DE)

(72) Inventors: Sebastian Mores, Munich (DE); Uwe Kiesewetter, Rain am Lech (DE); Marius Bebesel, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 164 days.

(21) Appl. No.: 15/878,852

(22) Filed: Jan. 24, 2018

(65) Prior Publication Data
US 2018/0208296 A1  Jul. 26, 2018

(30) Foreign Application Priority Data

Jan. 26, 2017  (EP) .................................... 17400003

(51) Int. Cl.
*B64C 11/46* (2006.01)
*B64C 11/00* (2006.01)
(Continued)

(52) U.S. Cl.
CPC ............ *B64C 11/46* (2013.01); *B64C 11/001* (2013.01); *B64C 27/08* (2013.01); *B64C 27/20* (2013.01); *B64C 29/0033* (2013.01)

(58) Field of Classification Search
CPC ... B64C 9/14; B64C 39/024; B64C 2201/027; B64C 2201/108; B64C 2201/162;
(Continued)

(56) References Cited

U.S. PATENT DOCUMENTS 3,350,035 A   10/1967  Schlieben
3,584,810 A    6/1971  Velton
(Continued)

FOREIGN PATENT DOCUMENTS

CN   201306711 Y   9/2009
CN   103010463 A   4/2013
(Continued)

OTHER PUBLICATIONS

Non-Final Office Action for U.S. Appl. No. 15/878,831, dated Jul. 25, 2019, 34 pages.
(Continued)

*Primary Examiner* — Woody A Lee, Jr.
*Assistant Examiner* — Justin A Pruitt
(74) *Attorney, Agent, or Firm* — Brooks Kushman P.C.

(57) ABSTRACT

A thrust producing unit for producing thrust in a predetermined direction, comprising a shrouding and at least two rotor assemblies, wherein the shrouding defines an internal volume, and wherein a first rotor assembly of the at least two rotor assemblies defines a first rotor axis and a second rotor assembly of the at least two rotor assemblies defines a second rotor axis, the first and second rotor axes being one of: (i) coaxially arranged, and (ii) inclined by associated inclination angles with respect to the predetermined direction, the associated inclination angles being comprised in a range between −60° and +60°, and preferably amounting to 0°, and wherein the first rotor assembly is arranged outside of the internal volume of the shrouding.

18 Claims, 7 Drawing Sheets

(51) Int. Cl.
  *B64C 27/08* (2006.01)
  *B64C 27/20* (2006.01)
  *B64C 29/00* (2006.01)

(58) Field of Classification Search
  CPC .......... B64C 2201/165; B64C 2241/00; B64C 11/001; B64C 11/46; B64C 11/48; B64C 27/08; B64C 27/20; B64C 27/52; B64C 29/02; B64C 29/0016; B64C 29/0025; B64C 29/0033; B64D 25/00
  USPC .......................... 415/123; 244/62, 65, 66, 69
  See application file for complete search history.

(56) References Cited

U.S. PATENT DOCUMENTS

| | | | |
|---|---|---|---|
| 5,150,857 A | 9/1992 | Moffitt et al. | |
| 6,467,724 B2 * | 10/2002 | Kuenkler | B63H 5/125 244/17.25 |
| 6,568,630 B2 | 5/2003 | Yoeli | |
| 7,510,142 B2 | 3/2009 | Johnson | |
| 7,802,755 B2 | 9/2010 | Poltorak | |
| 7,857,253 B2 | 12/2010 | Yoeli | |
| 7,946,528 B2 | 5/2011 | Yoeli | |
| 8,342,441 B2 | 1/2013 | Yoeli | |
| D678,169 S | 3/2013 | Kennelly et al. | |
| 8,393,564 B2 | 3/2013 | Kroo | |
| 8,733,690 B2 | 5/2014 | Bevirt et al. | |
| 10,399,674 B2 | 9/2019 | Goodrich | |
| 2006/0226281 A1 | 10/2006 | Walton | |
| 2007/0034738 A1 | 2/2007 | Sanders, Jr. et al. | |
| 2007/0057113 A1 | 3/2007 | Parks | |
| 2010/0108801 A1 | 5/2010 | Olm et al. | |
| 2010/0264256 A1 | 10/2010 | Yim et al. | |
| 2013/0068877 A1 | 3/2013 | Choi et al. | |
| 2013/0118856 A1 | 5/2013 | Long | |
| 2014/0091172 A1 | 4/2014 | Arlton et al. | |
| 2014/0151494 A1 | 6/2014 | Cvrlje | |
| 2014/0367509 A1 | 12/2014 | Smith | |
| 2015/0127209 A1 | 5/2015 | Al-Gami et al. | |
| 2016/0009387 A1 | 1/2016 | Kummer et al. | |
| 2016/0023754 A1 | 1/2016 | Wiegand | |
| 2016/0207625 A1 | 7/2016 | Judas et al. | |
| 2019/0256191 A1 | 8/2019 | Suzuki et al. | |

FOREIGN PATENT DOCUMENTS

| | | |
|---|---|---|
| CN | 104787316 A | 7/2015 |
| DE | 102005022706 A1 | 11/2006 |
| DE | 102013108207 A1 | 2/2015 |
| EP | 1502852 A1 | 2/2005 |
| EP | 2147858 A2 | 1/2010 |
| EP | 2234883 A2 | 10/2010 |
| EP | 2551190 A1 | 1/2013 |
| EP | 2551193 A1 | 1/2013 |
| EP | 2551198 A1 | 1/2013 |
| EP | 3098161 A1 | 11/2016 |
| GB | 905911 | 9/1962 |
| GB | 1474831 | 5/1977 |
| GB | 2360752 A | 10/2001 |
| GB | 2389826 A | 12/2003 |
| KR | 20110055842 A | 5/2011 |
| KR | 101451646 B1 | 10/2014 |
| WO | 0064736 A1 | 11/2000 |
| WO | 2004065208 A2 | 8/2004 |
| WO | 2009077968 A2 | 6/2009 |
| WO | 2015028627 A1 | 3/2015 |

OTHER PUBLICATIONS

International Search Report and Written Opinion for European Application No. EP 18152689, dated Mar. 8, 2018, 10 pages.
European Search Report for European Application No. EP 17400003, Completed by the European Patent Office, dated Jun. 22, 2017, 9 pages.
European Search Report for European Application No. EP 17400002, Completed by the European Patent Office, dated Jul. 11, 2017, 7 pages.
European Search Report for European Application No. EP 17400008, Completed by the European Patent Office, dated Aug. 18, 2017, 7 pages.
Notice of Preliminary Rejection for Korean Application No. 10-2018-0010073, dated May 27, 2019, 6 Pages.
Final Office Action for U.S. Appl. No. 15/878,831, dated Dec. 20, 2019, 43 pages.
Notice of Preliminary Rejection for Korean Application No. 10-2020-0028370, dated Apr. 1, 2020, 5 pages.

* cited by examiner

THRUST PRODUCING UNIT WITH AT LEAST TWO ROTOR ASSEMBLIES AND A SHROUDING

CROSS-REFERENCE TO RELATED APPLICATIONS

This application claims priority to European patent application No. EP 17400003.4 filed on Jan. 26, 2017, the disclosure of which is incorporated in its entirety by reference herein. This application is related to U.S. application Ser. No. 15/878,831 entitled "THRUST PRODUCING UNIT WITH AT LEAST TWO ROTOR ASSEMBLIES AND A SHROUDING" filed on Jan. 24, 2018.

BACKGROUND OF THE INVENTION

(1) Field of the Invention

The invention is related to a thrust producing unit for producing thrust in a predetermined direction, the thrust producing unit comprising a shrouding and at least two rotor assemblies. The invention is further related to a multirotor aircraft with at least one thrust producing unit for producing thrust in a predetermined direction, the thrust producing unit comprising a shrouding and at least two rotor assemblies.

2) Description of Related Art

Various conventional multirotor aircrafts are known, e. g. from the documents EP 2 551 190 A1, EP 2 551 193 A1, EP 2 551 198 A1, EP 2 234 883 A1, WO 2015/028627 A1, US D678 169 S, U.S. Pat. No. 6,568,630 B2, U.S. Pat. No. 8,393,564 B2, U.S. Pat. No. 7,857,253 B2, U.S. Pat. No. 7,946,528 B2, U.S. Pat. No. 8,733,690 B2, US 2007/0034738 A1, US 2013/0118856 A1, DE 10 2013 108 207 A1, GB 905 911 and CN 2013 06711 U. Other multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents US 2015/0127209 A1, DE 10 2005 022 706 A1 and KR 101 451 646 B1. Furthermore, multirotor aircraft studies and fictions also exist, such as e. g. the skyflyer SF MK II from Skyflyer Technology GmbH and the multicopter shown in the Avatar movie.

Each one of these conventional multirotor aircrafts is equipped with two or more thrust producing units that are provided for producing thrust in a predetermined direction during operation of the multirotor aircraft. In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is rather optimized for hover or forward flight conditions, while a thrust producing unit that implements e. g. a so-called Fenestron® tail rotor is particularly designed for hover conditions.

The document CN104787316 describes a multi-rotor vehicle comprising a frame and more than two rotor systems mounted on the frame. The rotor systems each comprise a main rotor unit and a contra rotary secondary rotor unit. The main rotor unit comprises a non ducted large main rotor. The secondary rotor comprises a ducted rotor of smaller dimensions than the main rotor. The secondary rotor and the main rotor are coaxial.

The document US2006226281 describes a VTOL vehicle. In the VTOL vehicle an outer frame is added for support of ducted fan units. The ducted fan units have each propellers totally housed inside a corresponding duct. Each ducted fan unit is comprised of two counter rotating propellers. Two counter rotating propellers cancel out torque effect. All the propellers have a shaft attached to with each propeller unit having a bevelled gear at the end of their shafts, inside a central gear box. Rotational power is transferred from a single power source to a main drive shaft through the use of the central gear box.

The document WO2004065208 describes an air-impeller engine having two contra-rotating rotor rings stacked inside a tilting mechanism in a two-engine VTOL vehicle. In the two-engine VTOL vehicle a top cap and a fuselage structure together form a hollow annular duct or shroud structure around a center air flow channel for the rotors. The duct or shroud structure isolates the rotors for safety, and also serves as a noise abatement shield. The shrouded walls may be made of sound absorbing or deadening material.

The document US2014151494 describes an aerial vehicle having a main rotor. Lift forces are generated by the main rotor and also at a duct inlet of a torus shaped fuselage, because as the main rotor rotates, it draws air into and across the inlet of fuselage at a high velocity. Thereby is induced suction along a top of the fuselage so as to produce lift by means of the fuselage.

The document GB1474831 describes a captive vertically ascendant airborne device. A mooring rope is attached between the airborne device and a ground station. The airborne device lifts by means of two oppositely rotating rotors and it carries a payload. The ground station accommodates a conventional winch to wind in the rope for controlling the airborne device, and for adjustment to a required altitude. The ground station also has a driving motor and also a further drive means to drive the rotors. The ground station also carries a landing assembly which holds the airborne device when in a lowered position.

The following documents have also been considered: EP2147858, EP3098161, GB2360752, GB2389826, US2007057113, US2013068877, US2014091172, US2015127209, US2016009387, US2016023754 U.S. Pat. No. 5,150,857 and WO0064736.

In all of these examples, the respective thrust producing unit is optimized for operation in axial air flow conditions, i. e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i. e. in an air flow direction that is oriented transverse to the rotor axis of the given one or more rotors or propellers and, therefore, referred to as a non-axial air flow direction, a respective efficiency of the thrust producing unit usually decreases considerably.

By way of example, in the case of operation of a multirotor aircraft with two or more thrust producing units, the thrust producing units will be subjected to axial air flow conditions e. g. during a vertical take-off phase. Subsequently, respective thrust vectors generated by the thrust producing units can be inclined in a predetermined direction, e. g. by rotating the thrust producing units accordingly, so that the multirotor aircraft gains velocity and leaves a previous hovering condition such that is converts to forward flight, wherein the thrust producing units are subjected to transversal air flow conditions. However, in the transversal air flow conditions, respective ducts or shrouds, which are beneficial in axial air flow conditions, are penalizing by generating a comparatively large amount of drag. In other words, an underlying advantage provided by the ducts or shrouds in hovering turns out to be a disadvantage in forward flight, which increases with increasing a respective advancing speed of the multirotor aircraft in forward flight.

Furthermore, it should be noted that in axial air flow conditions a ducted rotor or propeller, i. e. a rotor or propeller that is provided with a duct or shroud, is approximately 25% to 50% more efficient than an equivalent isolated or non-ducted rotor or propeller, i. e. a rotor or propeller without duct or shroud, which has comparable global dimensions, i. e. diameter and mean chord. In other words, the presence of a duct or shroud increases a respectively produced thrust of a given thrust producing unit at constant required power. Therefore, conventional thrust producing units are frequently provided with one or more rotors or propellers that is/are completely enclosed in an associated duct or shroud. This classical configuration uses a respective rotor or propeller induced velocity to generate thrust also from the duct or shroud.

In general, a duct or shroud is defined by an enclosed, annular surface that is arranged around a rotor or propeller in order to improve respective aerodynamics and performance of the rotor or propeller. A conventional duct or shroud which is usually not rotatable, i. e. cannot be inclined, and has a height that is selected such that a given rotor or propeller is fully enclosed therein.

However, as the duct or shroud must have a certain height or length in order to enclose an associated rotor or propeller and is, thus, comparatively large in size, the duct or shroud increases an overall weight of a respective multirotor aircraft due to its size, and further increases drag e. g. during forward flight, i. e. in transversal air flow conditions, as the duct or shroud cannot be inclined for adjustment of an underlying thrust vector direction. The comparatively large size also leads to a comparatively large projection surface on which wind and/or wind gust may act. This leads to an increased overpower necessity for the respective multirotor aircraft. Furthermore, if two or more rotor or propellers are e. g. coaxially positioned atop of each other, a given duct or shroud that is provided for enclosing these rotors or propellers will even require a still larger height and be still heavier. Moreover, conventional ducts or shrouds are usually not actively rotated and must be designed comparatively stiff, as usually a minimum gap between rotors or propellers and duct or shroud surface is requested. In addition, conventional ducts or shrouds of respective thrust producing units are not suitable for enclosing differently configured rotors or propellers, i. e. rotors or propellers having differing inclinations, positioning and/or sizes resp. diameters.

In summary, in a conventional thrust producing unit with a duct or shroud, a thrust vector that is produced in operation in axial air flow conditions is aligned with a rotor axis of a respective rotor or propeller of the thrust producing unit and directed against a direction of a velocity field induced by the rotor or propeller in operation. The rotor or propeller accelerates a certain mass-flow through an associated rotor or propeller plane or disk. A resulting flow acceleration, which occurs when air traverses the rotor or propeller plane or disk, forms areas of under-pressure around a respective collector region of the duct or shroud, thus, generating additional thrust. This generation of additional thrust is an important advantage resulting from the use of the duct or shroud that is, however, strongly penalizing in forward flight, i. e. in transversal air flow conditions, due to additional drag generated by the duct or shroud. The additional drag is directly proportional to a respective frontal area that is defined by a product of height and width of the duct or shroud. Thus, by way of example, for a thrust producing unit having a counter-rotating rotor or propeller configuration with two rotors or propellers that are completely embedded into a single duct or shroud, the additional drag almost doubles compared with a thrust producing unit that is only provided with one rotor or propeller that is completely embedded into a single duct or shroud.

BRIEF SUMMARY OF THE INVENTION

It is, therefore, an object of the present invention to provide a new thrust producing unit, in particular for use with multirotor aircrafts, which exhibits improved aerodynamics and performances.

This object is solved by a thrust producing unit for producing thrust in a predetermined direction, the thrust producing unit comprising the features of claim 1.

More specifically, according to the present invention a thrust producing unit for producing thrust in a predetermined direction comprises a shrouding and at least two rotor assemblies, wherein the shrouding defines an internal volume, and wherein a first rotor assembly of the at least two rotor assemblies defines a first rotor axis and a second rotor assembly of the at least two rotor assemblies defines a second rotor axis.

The first rotor axis is inclined by an associated first inclination angle with respect to the predetermined direction, the first inclination angle being longitudinal and comprised in a range between +1° and +60°, and the first rotor assembly being arranged outside of the internal volume of the shrouding.

The second rotor assembly is arranged inside the internal volume of the shrouding and is inclined by an associated second inclination angle with respect to the predetermined direction, the second inclination angle being in a range inferior to the range of the first inclination angle.

It should be noted that the term "shrouding" should be understood as encompassing simultaneously the terms "duct" and "shroud". In other words, in the context of the present invention, the term "shrouding" refers interchangeably to a duct or a shroud.

Advantageously, the inventive thrust producing unit is implemented as a shrouded multiple rotor assembly configuration that leads to a significantly reduced drag in transversal air flow conditions, e. g. in forward flight of a given multirotor aircraft that uses the inventive thrust producing unit, and furthermore exhibits a significantly lower weight than a conventional shrouded thrust producing unit having a single shrouding that completely encloses two rotor or propeller assemblies, while having comparable performances in axial air flow conditions, i. e. in hover flight of the respective multirotor aircraft. In fact, it should be noted that a conventional shrouded thrust producing unit having a single shrouding that completely encloses two or more, preferentially counter-rotating rotor or propeller assemblies provides the same thrust versus power characteristics than e. g. a thrust producing unit having a much shorter shrouding that encloses only one of the two or more rotor or propeller assemblies, such as the inventive thrust producing unit, while leaving the other(s) unshrouded, i. e. exposed to the air. This is due to the fact that the above-mentioned additional thrust is generated by a respective shroud collector defined by the shrouding only, and not by the duct resp. shrouding itself. Moreover, a respective velocity field induced by the at least two rotor or propeller assemblies with the long and short shroudings is such that the under-pressure field generated on the respective shroud collector is also the same for the long and short shroud configurations. This likewise applies to a configuration featuring multiple rotor or propeller assemblies, each being enclosed in a single associated shrouding having a minimized height.

Preferably, the shrouding of the inventive thrust producing unit is used as an additional lifting device during hover and forward flight cases of a multirotor aircraft that features the inventive thrust producing unit and, thus, beneficially allows reduction of a respective power consumption of the at most one of the at least two rotor assemblies that is accommodated in the shrouding. Furthermore, the shrouding advantageously allows to reduce at least an underlying diameter of the at most one of the at least two rotor assemblies that is accommodated therein, since the shrouding increases its effectiveness. In addition, the shrouding beneficially provides for a shielding effect with respect to the at most one of the at least two rotor assemblies that is accommodated therein and, thus, advantageously allows to reduce a respective rotor noise footprint on ground.

According to one aspect of the present invention, the inventive thrust producing unit can be provided with a foreign object protection, e. g. by being enclosed by a grid, in order to protect the at least rotor assemblies from foreign objects. Such a foreign object protection beneficially prevents misuse and accidents by and of individuals, e. g. by preventing them from getting their hands caught in rotating parts, thereby leading to an increased operational safety level of the inventive thrust producing unit.

Advantageously, by providing the inventive thrust producing unit with the at least two rotor assemblies that define different rotor planes, the rotor assemblies can be positioned above each other and rotated in a counter rotating manner, leading to a thrust producing unit that provides for an increased safety level and that allows reduction of the overall dimensions of an associated multirotor aircraft, resulting in a comparatively small aircraft, since the two or more rotor planes can be combined in a single thrust producing unit. Preferably, the at least two rotor assemblies of the inventive thrust producing unit, each of which defines an associated rotor plane or surface, are positioned on top of each other, either coaxially or with separate individual rotor axes, and can be inclined with respect to each other. Furthermore, the inventive thrust producing unit is adapted for providing torque individually as a result of its counter-rotating rotor assemblies, which can be used to maneuver a given multirotor aircraft that features the inventive thrust producing unit, e. g. with respect to yawing.

According to a preferred embodiment, the second rotor assembly is arranged outside of the internal volume of the shrouding.

According to a further preferred embodiment, the shrouding comprises a leading edge and a trailing edge, wherein the first rotor assembly is facing the leading edge, and wherein the second rotor assembly is facing the trailing edge.

According to a further preferred embodiment, the shrouding exhibits an outer diameter that is smaller than a diameter of at least one of the at least two rotor assemblies.

According to a further preferred embodiment, the second rotor assembly is arranged inside of the internal volume of the shrouding.

According to a further preferred embodiment, the shrouding comprises a leading edge and a trailing edge, wherein the first rotor assembly is facing the leading edge.

According to a further preferred embodiment, an additional shrouding is provided that accommodates the first rotor assembly.

According to a further preferred embodiment, the shrouding and the additional shrouding exhibit each a height that is comprised in a range between $0.04*D$ and $1*D$, wherein D defines a diameter of the second rotor assembly.

According to a further preferred embodiment, the shrouding and the additional shrouding are spaced apart from each other by an offset that is comprised in a range between $0.01*D$ and $2*D$, and preferably amounts to $0.17*D$, wherein D defines a diameter of the second rotor assembly.

According to a further preferred embodiment, the additional shrouding comprises a leading edge that points away from the shrouding, wherein a distance between the leading edge and a rotor plane that is defined by the first rotor assembly is comprised in a range between $-1*D$ and $1*D$, and preferably amounts to $-0.08*D$, wherein D defines a diameter of the second rotor assembly, and wherein the first rotor assembly is arranged outside of the additional shrouding if the distance is comprised in the range between $-1*D$ and 0, preferably facing the leading edge.

According to a further preferred embodiment, each one of the first and second rotor assemblies defines an associated rotor plane, wherein a predetermined distance between the associated rotor planes of the first and second rotor assemblies is comprised in a range between $0.01*D$ and $2*D$, and preferably amounts to $0.17*D$, wherein D defines a diameter of the second rotor assembly.

According to a further preferred embodiment, each one of the first and second rotor assemblies defines an associated rotor plane, wherein a predetermined distance between the associated rotor planes of the first and second rotor assemblies is comprised in a range between $0.01*D$ and $2*D$, and preferably amounts to $0.17*D$, wherein D defines a diameter of the second rotor assembly.

According to a further preferred embodiment, the first rotor assembly comprises at least two rotor blades and the second rotor assembly comprises at least two rotor blades.

According to a further preferred embodiment, the first rotor assembly is adapted to be rotated in a first rotation direction in operation and the second rotor assembly is adapted to be rotated in a second rotation direction in operation.

The present invention further relates to a multirotor aircraft comprising at least one thrust producing unit that is configured as described above.

Advantageously, the shrouding of the inventive thrust producing unit allows reducing respective overall dimensions of the inventive multirotor aircraft that features the inventive thrust producing unit. Furthermore, individuals approaching the shrouded thrust producing unit are protected against injury, foreign object damages of the thrust producing unit in operation, such as e. g. bird strike or wire strike, can securely and reliably be prevented, and the overall operational safety of the associated multirotor aircraft in the case of air collisions can be improved.

Moreover, respective aerodynamics, acoustics and performance can be improved by reducing a respective rotor blade loading in operation, reducing an overall power consumption, reducing a respective noise emission and ameliorating functioning in hover and forward flight of the inventive multirotor aircraft. Furthermore, an underlying required diameter of the thrust producing unit can be reduced. Additionally, lift of the inventive multirotor aircraft is improved by the shrouding itself, potentially reducing the overall power required by the inventive multirotor aircraft.

It should be noted that although the inventive aircraft is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units according to the present invention. Consequently, any reference to rotors or rotor structures in the present description should likewise be understood as a reference to propellers and propeller structures, so that the inventive multirotor aircraft can likewise be implemented as a multipropeller and/or multipropeller and -rotor aircraft.

In other words, the present invention principally relates to a multiple thrust configuration with rotors/propellers that define rotor/propeller planes, which can be selected to be positioned atop of each other individually, a rotor shrouding for enclosing any rotating parts of at most one of the rotors/propellers, at least one electrical engine which drives each rotor/propeller, wherein each engine can be segregated in order to increase a provided safety level, and wherein a logic connection preferably exists between battery and electrical engines, the logic connection preferentially comprising a redundant design increasing the safety level in case of failure, and wherein preferably a battery redundancy layout with an appropriate safety level in case of failure is provided.

Advantageously, the inventive multirotor aircraft is designed for transportation of passengers and is, in particular, suitable and adapted for being certificated for operation within urban areas. It is preferably easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incident, and is nevertheless adapted for fulfillment of an emergency landing, although these rotor characteristics lead to a comparatively low inertia and a non-adjustable torque in operation.

According to one aspect of the present invention, the inventive multirotor aircraft is capable of hovering and comprises a distributed propulsion system. It is further preferably designed with autorotation capability, which is necessary amongst other requirements in order to meet authority regulations, such as e.g. FAR and EASA regulations, regarding safety failure modes that amount up to approximately $1*10^{-7}$ failures per flight hour for the entire multirotor aircraft. In the aeronautical sector, these safety levels are typically defined by the so-called Design Assurance Levels (DAL) A to D.

Preferably, the inventive multirotor aircraft fulfils the authorities' regulation safety level needed to transport passengers. This is preferably achieved by a combination and correlation of:

at least two individual rotor assemblies per thrust producing unit,
a redundant, segregated battery layout,
a redundant power supply and harness layout,
a physical separation and segregation of an underlying power management,
redundant, segregated electrical engines, and
pitch control and/or RPM control of the rotor assemblies.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
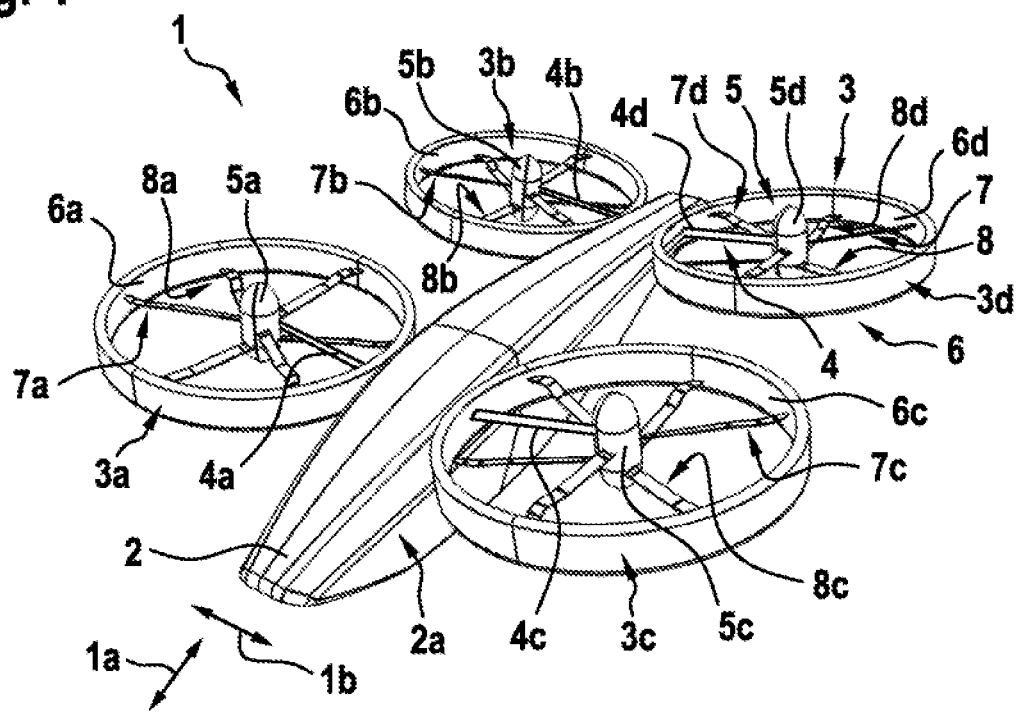
FIG. 1 shows a perspective view of a multirotor aircraft with a plurality of thrust producing units not claimed by the present invention.

FIG. 1 shows a multirotor aircraft 1 with an aircraft airframe 2. The aircraft airframe 2 defines a supporting structure that is also referred to hereinafter as the fuselage of the multirotor aircraft 1.

The fuselage 2 has an extension in longitudinal direction 1a and an extension in lateral direction 1b and preferably defines an internal volume 2a that is at least adapted for transportation of passengers, so that the multirotor aircraft 1 as a whole is adapted for transportation of passengers. The internal volume 2a is preferably further adapted for accommodating operational and electrical equipment, such as e. g. an energy storage system that is required for operation of the multirotor aircraft 1.

It should be noted that exemplary configurations of the internal volume 2a that are suitable for transportation of passengers, but also for accommodation of operational and electrical equipment, are readily available to the person skilled in the art and generally implemented to comply with applicable authority regulations and certification requirements regarding passenger transportation. Thus, as these configurations of the internal volume 2a as such are not part of the present invention, they are not described in detail for brevity and conciseness.

According to one aspect, the multirotor aircraft 1 comprises a plurality of thrust producing units 3. Preferably, the plurality of thrust producing units 3 comprises at least two and preferentially four thrust producing units 3a, 3b, 3c, 3d. The thrust producing units 3a, 3b, 3c, 3d are embodied for producing thrust (9 in FIG. 3) in operation, such that the multirotor aircraft 1 is able to hover in the air as well as to fly in any forward or rearward direction.

Preferably, the thrust producing units 3a, 3b, 3c, 3d are structurally connected to the fuselage 2. By way of example, this is achieved by means of a plurality of structural supports 4. More specifically, the thrust producing unit 3a is preferably connected to the fuselage 2 via a structural support 4a, the thrust producing unit 3b via a structural support 4b, the thrust producing unit 3c via a structural support 4c and the thrust producing unit 3d via a structural support 4d, wherein the structural supports 4a, 4b, 4c, 4d define the plurality of structural supports 4.

Preferably, at least one of the thrust producing units 3a, 3b, 3c, 3d comprises an associated shrouding in order to improve underlying aerodynamics and to increase operational safety. By way of example, a plurality of shrouding units 6 is shown with four separate shroudings 6a, 6b, 6c, 6d. Illustratively, the shrouding 6a is associated with the thrust producing unit 3a, the shrouding 6b with the thrust producing unit 3b, the shrouding 6c with the thrust producing unit 3c and the shrouding 6d with the thrust producing unit 3d.

The shroudings 6a, 6b, 6c, 6d can be made of a simple sheet metal. Alternatively, they may have a complex geometry, such as e. g. described below with reference to FIG. 5.

Furthermore, the shroudings 6a, 6b, 6c, 6d can be connected to the fuselage 2 together with the structural supports 4a, 4b, 4c, 4d, in order to reinforce the connection between the thrust producing units 3a, 3b, 3c, 3d and the fuselage 2. Alternatively, only the shroudings 6a, 6b, 6c, 6d can be connected to the fuselage 2.

According to one aspect, at least one and, preferably, each one of the thrust producing units 3a, 3b, 3c, 3d is equipped with at least two rotor assemblies. By way of example, the thrust producing unit 3a is equipped with two rotor assemblies 7a, 8a, the thrust producing unit 3b is equipped with two rotor assemblies 7b, 8b, the thrust producing unit 3c is equipped with two rotor assemblies 7c, 8c and the thrust producing unit 3d is equipped with two rotor assemblies 7d, 8d. The rotor assemblies 7a, 7b, 7c, 7d illustratively define a plurality of upper rotor assemblies 7 and the rotor assemblies 8a, 8b, 8c, 8d illustratively define a plurality of lower rotor assemblies 8.

The plurality of upper and lower rotor assemblies 7, 8 is preferably connected to the plurality of structural supports 4 by means of a plurality of gearbox fairings 5. Illustratively, the upper and lower rotor assemblies 7a, 8a are connected to the structural support 4a by means of a gearbox fairing 5a, the upper and lower rotor assemblies 7b, 8b are connected to the structural support 4b by means of a gearbox fairing 5b, the upper and lower rotor assemblies 7c, 8c are connected to the structural support 4c by means of a gearbox fairing 5c and the upper and lower rotor assemblies 7d, 8d are connected to the structural support 4d by means of a gearbox fairing 5d.

Figure 6:
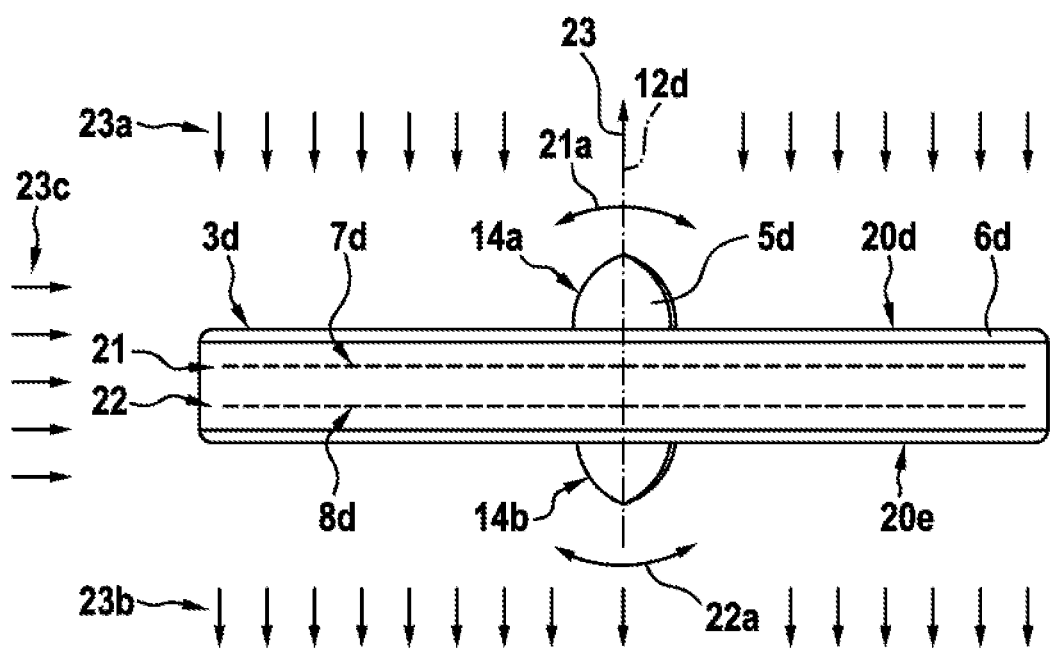
FIG. 6 shows a partly transparent side view of the thrust producing unit of FIG. 5.

Preferably, each one of the upper rotor assemblies 7a, 7b, 7c, 7d defines an associated upper rotor plane (21 in FIG. 6) and each one of the lower rotor assemblies 8a, 8b, 8c, 8d defines an associated lower rotor plane (22 in FIG. 6). Preferably, the upper and lower rotor assemblies 7a, 7b, 7c, 7d, 8a, 8b, 8c, 8d define pairs of upper and lower rotor assemblies 7a, 8a; 7b, 8b; 7c, 8c; 7d, 8d that are accommodated in the shroudings 6a, 6b, 6c, 6d, respectively, so that the associated upper and lower rotor planes (21, 22 in FIG. 6) are located inside the shroudings 6a, 6b, 6c, 6d of the multirotor aircraft 1.

According to one aspect, the multirotor aircraft 1 comprises an aircraft operating structure and a redundant security architecture. The aircraft operating structure is preferably adapted for operation of the multirotor aircraft 1 in failure-free operating mode and the redundant security architecture is preferably at least adapted for operation of the multirotor aircraft 1 in case of a failure of the aircraft operating structure. In particular, the redundant security architecture is provided to comply preferentially with applicable authority regulations and certification requirements regarding passenger transportation.

Preferably, the aircraft operating structure comprises at least a first part of the upper and lower rotor assemblies 7a, 7b, 7c, 7d, 8a, 8b, 8c, 8d and the redundant security architecture comprises at least a second part of the upper and lower rotor assemblies 7a, 7b, 7c, 7d, 8a, 8b, 8c, 8d. Preferentially, a first one of the upper and lower rotor assemblies 7a, 8a, 7b, 8b, 7c, 8c, 7d, 8d of each thrust producing unit 3a, 3b, 3c, 3d is associated with the aircraft operating structure, while a second one is associated with the redundant security architecture. By way of example, the upper rotor assemblies 7a, 7b, 7c, 7d are associated with the aircraft operating structure and the lower rotor assemblies 8a, 8b, 8c, 8d are associated with the redundant security architecture. Thus, at least in case of a failure of the upper rotor assemblies 7a, 7b, 7c, 7d, the lower rotor assemblies 8a, 8b, 8c, 8d operate the multirotor aircraft 1 in order to avoid e. g. a crash thereof.

It should, however, be noted that the above configuration, wherein the upper rotor assemblies 7a, 7b, 7c, 7d are associated with the aircraft operating structure and the lower rotor assemblies 8a, 8b, 8c, 8d are associated with the redundant security architecture, is merely described by way of example and not for limiting the invention thereto. Instead, alternative associations are likewise possible and contemplated. For instance, the rotor assemblies 7a, 7c, 8b, 8d can be associated with the aircraft operating structure, while the rotor assemblies 8a, 8c, 7b, 7d are associated with the redundant security architecture, and so on. As such alternative associations are readily available to the person skilled in the art, they are likewise contemplated and considered as being part of the present invention.

Figure 2:
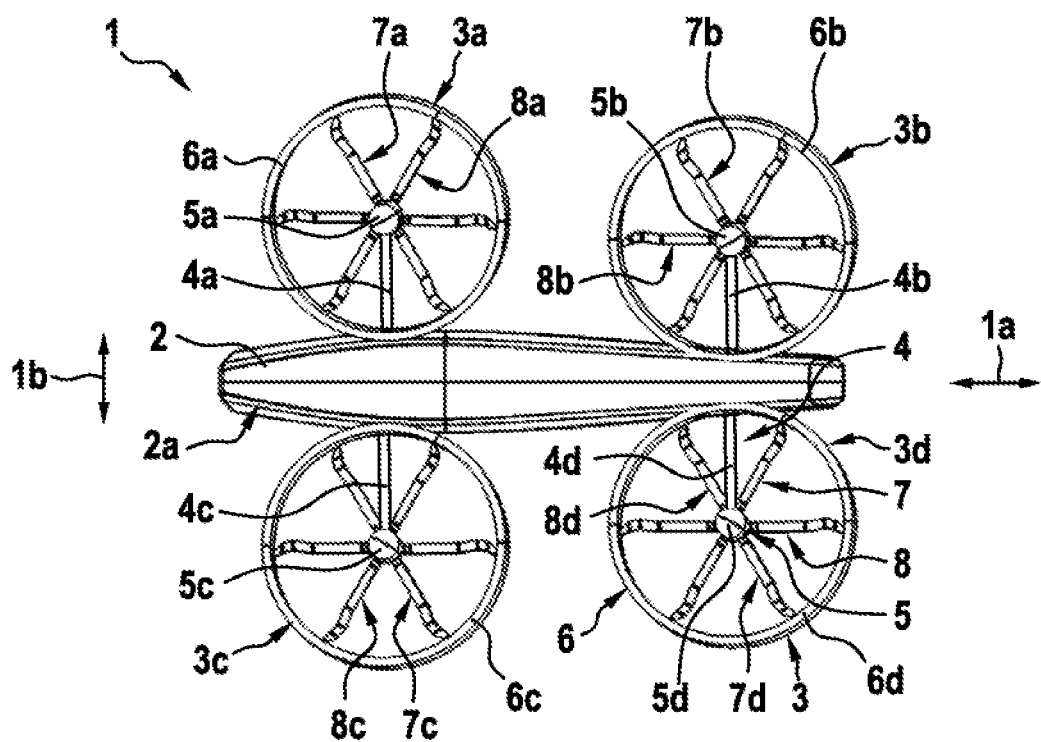
FIG. 2 shows a top view of the multirotor aircraft of FIG. 1.

FIG. 2 shows the multirotor aircraft 1 of FIG. 1 with the thrust producing units 3a, 3b, 3c, 3d that are connected to the fuselage 2. The thrust producing units 3a, 3b, 3c, 3d respectively comprise the upper and lower rotor assemblies 7a, 7b; 7b, 8b; 7c, 8c; 7d, 8d, which are preferably arranged in a side-by-side configuration with congruent rotor axes (12 in FIG. 3 and FIG. 4). Preferentially, the upper rotor assemblies 7a, 7b, 7c, 7d are arranged above the lower rotor assemblies 8a, 8b, 8c, 8d such that the upper and lower rotor assemblies 7a, 7b; 7b, 8b; 7c, 8c; 7d, 8d are stacked, i. e. arranged on top of each other with congruent rotor axes (12 in FIG. 3 and FIG. 4). However, alternative configurations are likewise contemplated, such as e. g. described below with reference to FIG. 11.

As can further be seen from FIG. 2, the thrust producing units 3a, 3b, 3c, 3d are all exemplarily arranged laterally with respect to the fuselage 2, i. e. on the left or right side of the fuselage 2 seen in its longitudinal direction 1a. Illustratively, the left side corresponds to the lower side and the right side to the upper side of the fuselage 2 as shown in FIG. 2. Furthermore, the fuselage 2 is exemplarily embodied such that the laterally arranged thrust producing units 3a, 3b, 3c, 3d define at least approximately a trapezoidal shape.

However, it should be noted that this exemplary arrangement is only described by way of example and other arrangements are also possible and likewise contemplated. For instance, two of the thrust producing units 3a, 3b, 3c, 3d can respectively be arranged at a front and rear section of the fuselage 2, and so on.

Figure 3:
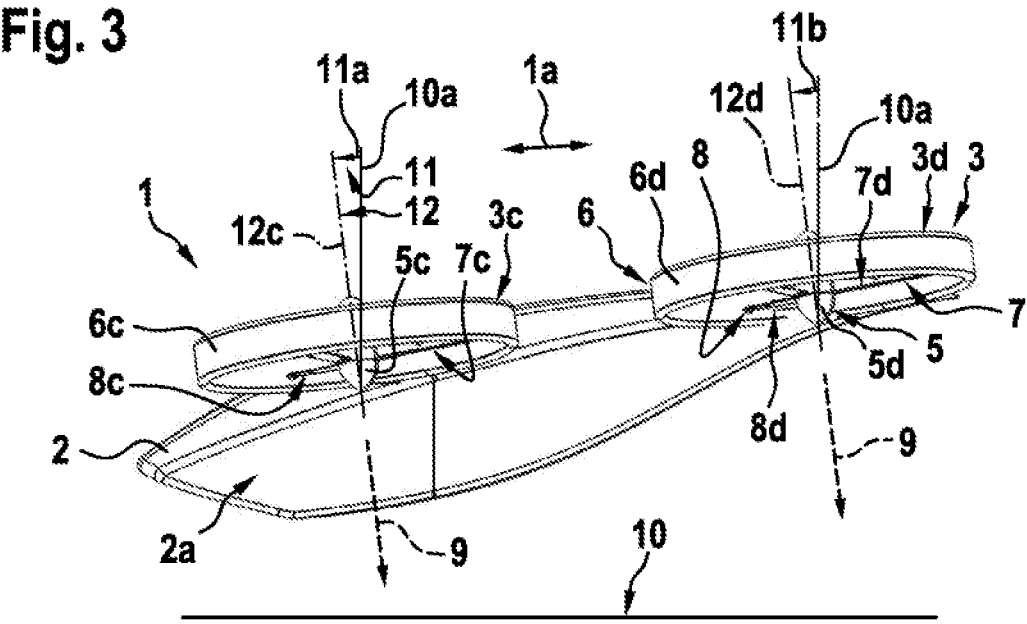
FIG. 3 shows a side view of the multirotor aircraft of FIG. 1 and FIG. 2 in normal flight mode.

FIG. 3 shows the multirotor aircraft 1 of FIG. 1 and FIG. 2 in an exemplary failure-free operating mode. In this exemplary failure-free operating mode, the plurality of thrust producing units 3 produce airstreams in a thrust producing airstream direction 9 by means of the plurality of upper and/or lower rotor assemblies 7, 8 that is suitable to lift the multirotor aircraft 1 off ground 10.

Each one of the plurality of upper rotor assemblies 7 defines a first rotor axis and each one of the plurality of lower rotor assemblies 8 defines a second rotor axis. Preferably, the first and second rotor axes are respectively congruent, i. e. coaxially arranged, so that the plurality of upper and lower rotor assemblies 7, 8 define a plurality of coaxially arranged rotor axes 12. Illustratively, the upper and lower rotor assemblies 7c, 8c define first and second congruent rotor axes, which are commonly referred to as the rotor axis 12c, and the upper and lower rotor assemblies 7d, 8d define first and second congruent rotor axes, which are commonly referred to as the rotor axis 12d.

Preferably, the plurality of thrust producing units 3 is inclined in the longitudinal direction 1a of the multirotor aircraft 1 by a plurality of longitudinal inclination angles 11 in order to increase the maneuverability of the multirotor aircraft 1 and to reduce an overall inclination in the longitudinal direction 1a of the multirotor aircraft 1 during forward flight. The plurality of longitudinal inclination angles 11 is illustratively defined between a vertical reference line 10a of the multirotor aircraft 1 and the plurality of coaxially arranged rotor axes 12. Preferably, a possible and realized number of the plurality of longitudinal inclination angles 11 depends on an underlying number of provided thrust producing units.

More specifically, according to one aspect, at least one of the plurality of thrust producing units 3 is inclined in the longitudinal direction 1a of the multirotor aircraft 1 by a first longitudinal inclination angle defined between a vertical reference line 10a of the multirotor aircraft 1 and the first and second congruent rotor axes of this at least one of the plurality of thrust producing units 3. The first longitudinal inclination angle is preferably comprised in a range between −45° and +80°, and preferentially amounts to 7°.

Illustratively, the thrust producing unit 3c of the plurality of thrust producing units 3 is inclined by a first longitudinal inclination angle 11a defined between the vertical reference line 10a and the rotor axis 12c, wherein the first longitudinal inclination angle 11a is preferably comprised in a range between −45° and +80°, and preferentially amounts to 7°. However, it should be noted that the thrust producing unit 3a of the plurality of thrust producing units 3 of FIG. 1 and FIG. 2 is preferably also inclined by the first longitudinal inclination angle 11a.

According to one aspect, at least one of the plurality of thrust producing units 3 is inclined in the longitudinal direction 1a of the multirotor aircraft 1 by a second longitudinal inclination angle defined between the vertical reference line 10a and the first and second congruent rotor axes of this at least one of the plurality of thrust producing units 3. The second longitudinal inclination angle is preferably also comprised in a range between −45° and +80°, and preferentially amounts to 7°.

Illustratively, the thrust producing unit 3d of the plurality of thrust producing units 3 is inclined by a second longitudinal inclination angle 11b defined between the vertical reference line 10a and the rotor axis 12d, wherein the second longitudinal inclination angle 11b is preferably comprised in a range between −45° and +80°, and preferentially amounts to 7°. However, it should be noted that the thrust producing unit 3b of the plurality of thrust producing units 3 of FIG. 1 and FIG. 2 is preferably also inclined by the second longitudinal inclination angle 11b.

Figure 4:
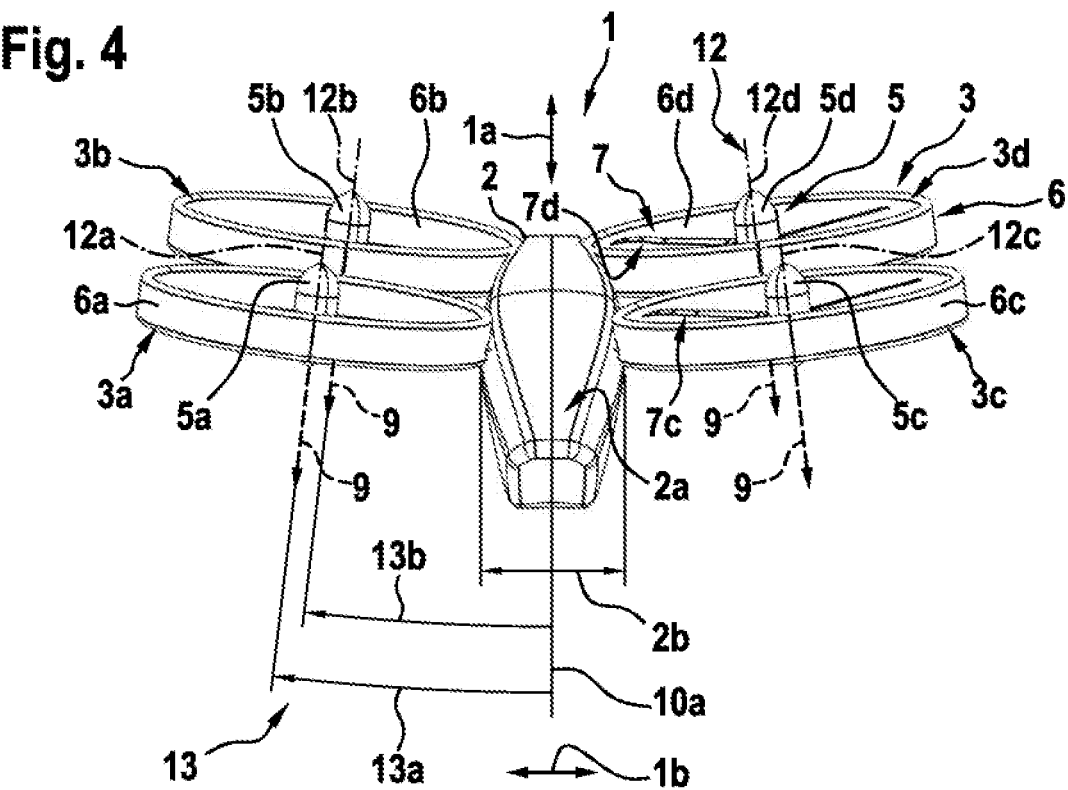
FIG. 4 shows a front view of the multirotor aircraft of FIG. 3.

FIG. 4 shows the multirotor aircraft 1 with the fuselage 2 of FIG. 3, which illustratively comprises a width 2b. The latter is defined as a maximum distance measured orthogonally to the longitudinal direction 1a of the multirotor aircraft 1 between the respective outmost left hand and right hand side surfaces of the fuselage 2.

According to FIG. 3, the multirotor aircraft 1 is shown in the exemplary failure-free operating mode, wherein the plurality of thrust producing units 3 produce airstreams in the thrust producing airstream direction 9 by means of the plurality of upper and lower rotor assemblies 7, 8. The upper and lower rotor assemblies 7c, 8c define the rotor axis 12c and the upper and lower rotor assemblies 7d, 8d define the rotor axis 12d.

Furthermore, the upper and lower rotor assemblies 7a, 8a exemplarily define first and second congruent rotor axes, which are commonly referred to as the rotor axis 12a, and the upper and lower rotor assemblies 7b, 8b define first and second congruent rotor axes, which are commonly referred to as the rotor axis 12b. It should be noted that the rotor axes 12a, 12b, 12c, 12d are preferably implemented as described in order to reduce the overall complexity, system weight as well as geometrical size of the multirotor aircraft 1.

Preferably, the plurality of thrust producing units 3 is inclined in the lateral direction 1b of the multirotor aircraft 1 by a plurality of lateral inclination angles 13 in order to provide reduced gust sensitivity and to increase the maneuverability of the multirotor aircraft 1. The plurality of lateral inclination angles 13 is illustratively defined between the vertical reference line 10a of the multirotor aircraft 1 and the plurality of coaxially arranged rotor axes 12. Preferably, a possible and realized number of the plurality of lateral inclination angles 13 depends on an underlying number of provided thrust producing units.

More specifically, according to one aspect, at least one of the plurality of thrust producing units 3 is inclined in the lateral direction 1b of the multirotor aircraft 1 by a first lateral inclination angle defined between the vertical reference line 10a of the multirotor aircraft 1 and the first and second congruent rotor axes of this at least one of the plurality of thrust producing units 3. The first lateral inclination angle is preferably comprised in a range between −45° and +80°, and preferentially amounts to 5°.

Illustratively, the thrust producing unit 3a of the plurality of thrust producing units 3 is inclined by a first lateral inclination angle 13a defined between the vertical reference line 10a and the rotor axis 12a, wherein the first lateral inclination angle 13a is preferably comprised in a range between −45° and +80°, and preferentially amounts to 5°. However, it should be noted that the thrust producing unit 3c of the plurality of thrust producing units 3 of FIG. 1 and FIG. 2 is preferably also inclined by the first lateral inclination angle 13a.

According to one aspect, at least one of the plurality of thrust producing units 3 is inclined in the lateral direction 1b of the multirotor aircraft 1 by a second lateral inclination angle defined between the vertical reference line 10a of the multirotor aircraft 1 and the first and second congruent rotor axes of this at least one of the plurality of thrust producing units 3. The second lateral inclination angle is preferably comprised in a range between −45° and +80°, and preferentially amounts to 5°.

Illustratively, the thrust producing unit 3b of the plurality of thrust producing units 3 is inclined by a second lateral inclination angle 13b defined between the vertical reference line 10a and the rotor axis 12b, wherein the second lateral inclination angle 13b is preferably comprised in a range between −45° and +80°, and preferentially amounts to 5°. However, it should be noted that the thrust producing unit 3d of the plurality of thrust producing units 3 of FIG. 1 and FIG. 2 is preferably also inclined by the second lateral inclination angle 13b.

Figure 5:
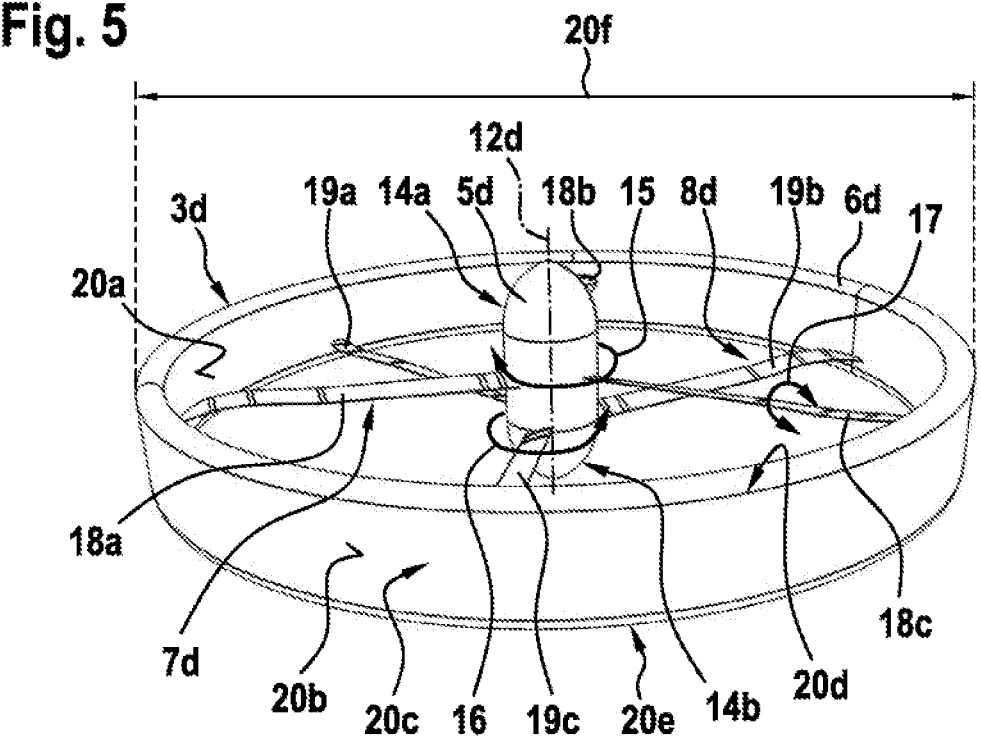
FIG. 5 shows a perspective view of a thrust producing unit of the multirotor aircraft of FIG. 1 to FIG. 4.

FIG. 5 shows the thrust producing unit 3d of the preceding figures, with its upper rotor assembly 7d, its lower rotor assembly 8d, its gearbox fairing 5d and its shrouding 6d for further illustrating an exemplary configuration thereof. It should, however, be noted that the thrust producing units 3a, 3b, 3c of the preceding figures preferably comprise similar configurations, so that the thrust producing unit 3d is only described representative for all thrust producing units 3a, 3b, 3c, 3d, for brevity and conciseness.

Illustratively, the shrouding 6d has an inner surface 20a and an outer surface 20b with an outer diameter 20f. The shrouding 6d exemplarily further defines a leading edge 20d and a trailing edge 20e. Preferably, an internal volume 20c is defined between the inner surface 20a, the outer surface 20b, the leading edge 20d and the trailing edge 20e. This inner volume 20c can e. g. be used as storage volume for a battery system of the multirotor aircraft 1 of the preceding figures.

The shrouding 6d can be made of a simple pressed, bended metal sheet such that the inner and outer surfaces 20a, 20b are substantially parallel to each other, i. e. feature an almost constant distance with respect to each other. However, it may as well have a complex geometry. Illustratively, the shrouding 6d accommodates the upper rotor assembly 7d and the lower rotor assembly 8d.

According to one aspect, the upper rotor assembly 7d comprises at least two and, illustratively, three rotor blades 18a, 18b, 18c for producing thrust in operation. Similarly, the lower rotor assembly 8d preferably also comprises at least two and, illustratively, three rotor blades 19a, 19b, 19c for producing thrust in operation.

Furthermore, preferably at least one first engine 14a is provided for driving the rotor blades 18a, 18b, 18c, i. e. the upper rotor assembly 7d in operation and at least one second engine 14b is provided for driving the rotor blades 19a, 19b, 19c, i. e. the lower rotor assembly 8d in operation. The at least one first engine 14a is preferably associated with the aircraft operating structure described above with reference to FIG. 1, and the at least one second engine 14b is preferably associated with the redundant security architecture described above with reference to FIG. 1. Illustratively, the at least one first and second engines 14a, 14b are arranged inside of and, thus, encompassed by the gearbox fairing 5d.

It should be noted that optionally one or more gearboxes can be introduced between the at least one first and second engines 14a, 14b and the rotor blades 18a, 18b, 18c respectively 19a, 19b, 19c. By such an optional introduction of one or more gearboxes, an operating efficiency of the at least one first and second engines 14a, 14b can be increased since their rotational speed is increased.

It should further be noted that the at least one first and second engines 14a, 14b can be implemented by any suitable engine that is capable of producing torque in operation, such as a turbine, diesel engine, Otto-motor, electrical engine and so on, and that can be connected to the rotor blades 18a, 18b, 18c respectively 19a, 19b, 19c for rotating these rotor blades 18a, 18b, 18c respectively 19a, 19b, 19c, i. e. the upper and lower rotor assemblies 7d respectively 8d, in operation. However, as such engines are well-known to the person skilled in the art they are not described in greater detail for brevity and conciseness.

Preferably, the upper rotor assembly 7d is adapted to be rotated in a first rotation direction 15 in operation. Similarly, the lower rotor assembly 8d is adapted to be rotated in a second rotation direction 16 in operation. Illustratively, the first and second rotation directions 15, 16 are preferably opposed to each other.

According to one aspect, at least the upper rotor assembly 7d and, more specifically, its rotor blades 18a, 18b, 18c, are provided with an optional pitch variation 17. Similarly, the lower rotor assembly 8d, i. e. its rotor blades 19a, 19b, 19c, are preferably also provided with such an optional pitch variation. In this case, control of the produced airstream in the thrust producing airstream direction 9 of FIG. 3 and FIG. 4 can either be achieved in operation by means of pitch variation, by means of RPM variation or by means of a combination of pitch and RPM variation.

In contrast thereto, if the upper and lower rotor assemblies 7d, 8d are not provided with such an optional pitch variation, e. g. if the rotor blades 18a, 18b, 18c respectively 19a, 19b, 19c are implemented as fixed pitch blades, control of the produced airstream in the thrust producing airstream direction 9 of FIG. 3 and FIG. 4 in operation by means of pitch variation cannot by performed. In this case, only RPM variation can be used for control of the airstream in the thrust producing airstream direction 9 of FIG. 3 and FIG. 4 that is produced by the upper and lower rotor assembly 7d, 8d in operation.

According to one aspect, each one of the upper and lower rotor assemblies 7d, 8d is individually sized and comprises a diameter that ranges from 0.05 to 6 times of the fuselage width 2b of FIG. 4, which is designated as W hereinafter for simplicity. In other words, the diameter of each one of the upper and lower rotor assemblies 7d, 8d preferably ranges from 0.05*W to 6*W, and preferentially amounts to 1.5*W.

FIG. 6 shows a schematic view of the thrust producing unit 3d of FIG. 5 with the upper and lower rotor assemblies 7d, 8d, which are arranged inside of the shrouding 6d, and which preferably define separated rotor planes 21, 22 in order to reach a required safety level and a satisfying flight mechanical behaviour. Illustratively, the rotor planes 21, 22 are arranged on top of each other. Preferably, a predetermined distance between the rotor planes 21, 22 is comprised in a range between 0.01*D and 2*D, and preferably amounts to 0.17*D, wherein D defines a diameter of the second rotor assembly 8d.

The upper and lower rotor assemblies 7d, 8d are driven in operation by the at least one first and second engines 14a, 14b, respectively, which are arranged in the gearbox fairing 5d. As described above, the upper and lower rotor assemblies 7d, 8d preferably rotate around the rotor axis 12d that is commonly defined by a first rotor axis associated with the upper rotor assembly 7d and a second rotor axis 8d associated with the lower rotor assembly 8d.

According to one aspect of the present invention, these first and second rotor axes can be inclined by associated inclination angles 21a, 22a. The latter are preferably comprised in a range between −60° and +60°, and preferentially amount to 0°.

If, however, the associated inclination angles 21a, 22a are selected such that the rotor planes 21, 22 intersect, the upper and lower rotor assemblies 7d, 8d are intermeshing in operation. This may be allowable to actively rotate the at least one first and second engines 14a, 14b about the corresponding rotor planes 21, 22 in order to vary an underlying direction, i. e. thrust vector 23. Alternatively, the rotor axis 12d as such can be inclined by one of the associated inclination angles 21a, 22a.

In operation of the thrust producing unit 3d, rotation of the upper and lower rotor assemblies 7d, 8d around the rotor axis 12d generates an air inflow 23a and an air outflow 23b through the rotor planes 21, 22. The air inflow 23a and the air outflow 23b themselves produce thrust and further produce an additional thrust by acting on the shrouding 6d. This will lead to a total thrust illustrated by a thrust vector 23, which will allow the multirotor aircraft 1 of FIG. 1 to FIG. 4 to be lifted. It should be noted that at the same thrust level, a respective amount of power needed by the at least one first and second engines 14a, 14b driving the upper and lower rotor assemblies 7d, 8d will be significantly lower than the power needed to drive the upper and lower rotor assemblies 7d, 8d without the shrouding 6d.

However, during forward flight or upon occurrence of essentially horizontal wind gusts, an airstream in an exemplary free airstream direction 23c acts on the shrouding 6d, i. e. on its outer surface 20b. This leads to undesirable drag in the direction 23c on the thrust producing unit 3d and, thus, on the multirotor aircraft 1 of FIG. 1 to FIG. 4, which is disadvantageous for a respective power consumption of the multirotor aircraft 1.

Figure 7:
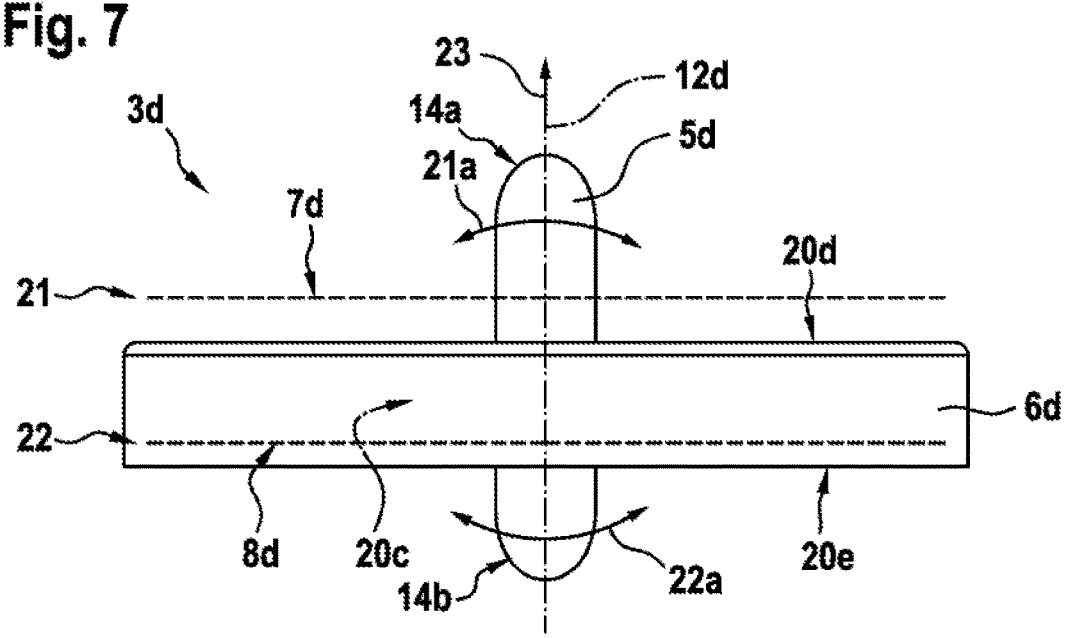
FIG. 7 shows a partly transparent side view of a thrust producing unit according to an embodiment of the present invention.

FIG. 7 shows the thrust producing unit 3d of the invention, which is configured to produce thrust in direction of the thrust vector 23 and includes at least the two rotor assemblies 7d, 8d, and the shrouding 6d, which illustratively defines the internal volume 20c, the leading edge 20d and the trailing edge 20e according to FIG. 5. Each one of the at least two rotor assemblies 7d, 8d defines its associated rotor plane 21 resp. 22. Furthermore, each one of the at least two rotor assemblies 7d, 8d defines its associated rotor axis 12d.

By way of example, the rotor axes 12d of the at least two rotor assemblies 7d, 8d are arranged coaxially. Alternatively, they can be inclined by associated inclination angles 21a, 22a with respect to the direction of the thrust vector 23. The associated inclination angles 21a, 22a are preferably comprised in a range between −60° and +60°, and preferentially amount to 0°.

The first rotor assembly 7d is preferably provided for operating in a failure-free operating mode of the thrust producing unit 3d and the second rotor assembly 8d is preferably provided for operating at least in case of a failure of the first rotor assembly 7d. However, it should be noted that the first rotor assembly 7d must not necessarily be provided for operating in the failure-free operating mode of the thrust producing unit 3d and the second rotor assembly 8d must not necessarily be provided for operating at least in case of the failure of the first rotor assembly 7d. Instead, the second rotor assembly 8d can be configured for operating in the failure-free operating mode of the thrust producing unit 3d and the first rotor assembly 7d can be configured for operating at least in case of the failure of the second rotor assembly 8d. Furthermore, the first and second rotor assemblies 7d, 8d can be configured for operating together in the failure-free operating mode, etc.

According to one aspect and in contrast to the embodiment of the thrust producing unit 3d described above with reference to FIG. 5 and FIG. 6, however, the shrouding 6d now preferably accommodates at most one of the at least two rotor assemblies 7d, 8d. More specifically, preferably at least one of the at least two rotor assemblies 7d, 8d and, illustratively, the first rotor assembly 7d is arranged outside of the internal volume 20c of the shrouding 6d. Preferentially, the first rotor assembly 7d is facing the leading edge 20d of the shrouding 6d. Furthermore, according to one aspect, the second rotor assembly 8d is arranged inside of the internal volume 20c of the shrouding 6d.

Figure 8:
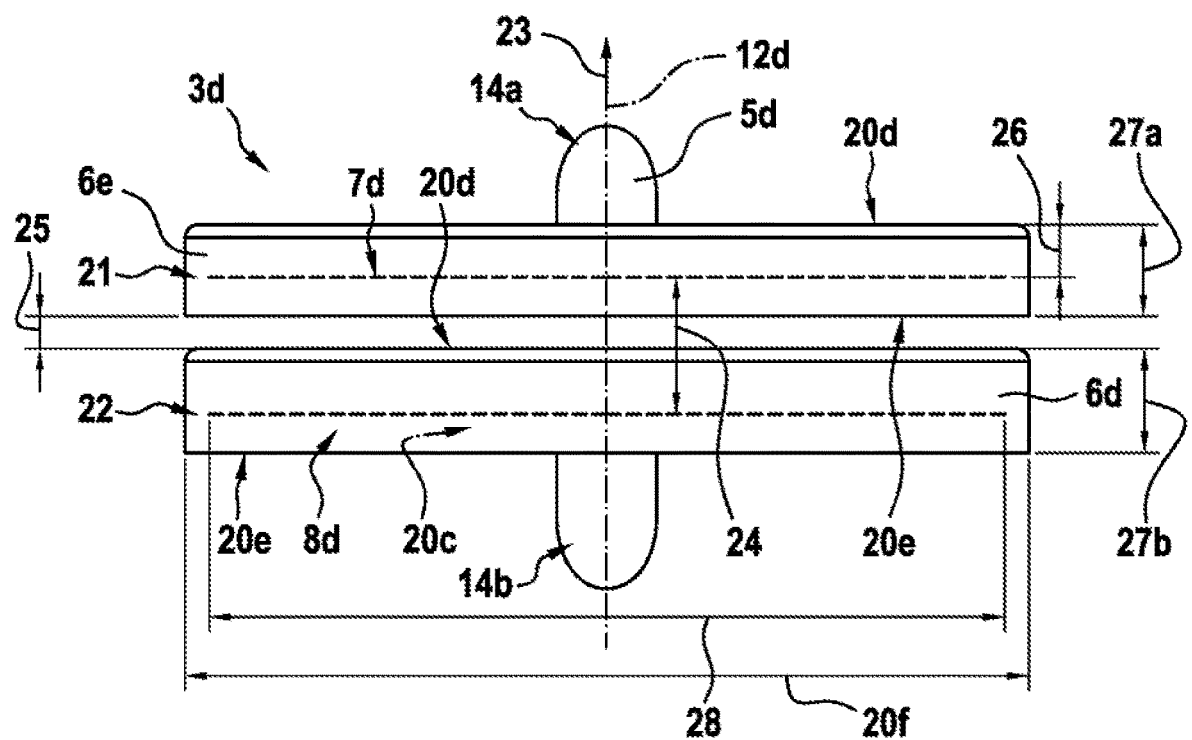
FIG. 8 shows a partly transparent side view of a thrust producing unit according to another embodiment of the present invention.

FIG. 8 shows the thrust producing unit 3d of FIG. 7, which is configured to produce thrust in direction of the thrust vector 23 and includes at least the two rotor assemblies 7d, 8d, and the shrouding 6d, which illustratively defines the internal volume 20c, the leading edge 20d and the trailing edge 20e, and which illustratively exhibits the outer diameter 20f. Each one of the at least two rotor assemblies 7d, 8d defines its associated rotor plane resp. 22. Furthermore, each one of the at least two rotor assemblies 7d, 8d defines its associated rotor axis 12d, both of which are exemplarily arranged coaxially. Moreover, the second rotor assembly 8d is arranged inside of the internal volume 20c of the shrouding 6d.

According to one aspect and in contrast to the embodiment of the thrust producing unit 3d described above with reference to FIG. 7, however, now an additional shrouding 6e is provided. Preferably, the additional shrouding 6e accommodates the first rotor assembly 7d.

Illustratively, the additional shrouding 6e also defines a leading edge and a trailing edge. For brevity and simplicity, similar to the shrouding 6d the leading edge of the additional shrouding is labelled with the reference sign 20d and the trailing edge of the additional shrouding 6e is labelled with the reference sign 20e. Illustratively, the trailing edge 20e of the additional shrouding 6e faces the leading edge 20d of the shrouding 6d.

According to one aspect, a predetermined distance 24 between the associated rotor planes 21, 22 of the first and second rotor assemblies 21, 22 is comprised in a range between 0.01*D and 2*D, and preferentially amounts to 0.17*D, wherein D defines a diameter of the second rotor assembly 8d. Preferably, the shrouding 6d and the additional shrouding 6e are spaced apart from each other by an offset 25 that is comprised in a range between 0.01*D and 2*D. The offset 25 preferentially amounts to 0.17*D.

A distance 26 between the leading edge 20d of the additional shrouding 6e and the rotor plane 21 that is defined by the first rotor assembly 7d is preferably comprised in a range between −1*D and 1*D. Preferentially, the distance 26 amounts to −0.08*D. It should be noted that the first rotor assembly 7d will be arranged outside of the additional shrouding 6e and preferably faces the leading edge 20d if the distance 26 is comprised in the range between −1*D and 0. Preferably, the shrouding 6d and the additional shrouding 6e exhibit each a height 27a resp. 27b that is comprised in a range between 0.04*D and 1*D.

According to one aspect, the outer diameter 20f of the shrouding 6d is smaller than a diameter of at least one of the at least two rotor assemblies 7d, 8d, e. g. a diameter 28 of the second rotor assembly 8d. It should, however, be noted that this feature is not illustrated in FIG. 8, but readily understandable by the person skilled in the art when being viewed in conjunction with FIG. 7 or, in particular, FIG. 9.

It should be noted that in the configurations of the thrust producing unit 3d as illustrated in FIG. 8 and FIG. 7, a respective undesirable drag in forward flight, as described above with reference to FIG. 6, is reduced and the thrust generated by the shrouding 6d resp. the additional shrouding 6e, other non-rotating elements of the thrust producing unit 3d, which adds to the thrust generated by at least two assemblies 7d, 8d, as well as rotating elements thereof, increase a respective efficiency of the thrust producing unit 3d, which is defined as T*Vi/PTOT, with T being the thrust generated by one of the at least two rotor assemblies 7d, 8d, Vi its induced velocity and PTOT the required total power of the thrust producing unit 3d.

Figure 9:
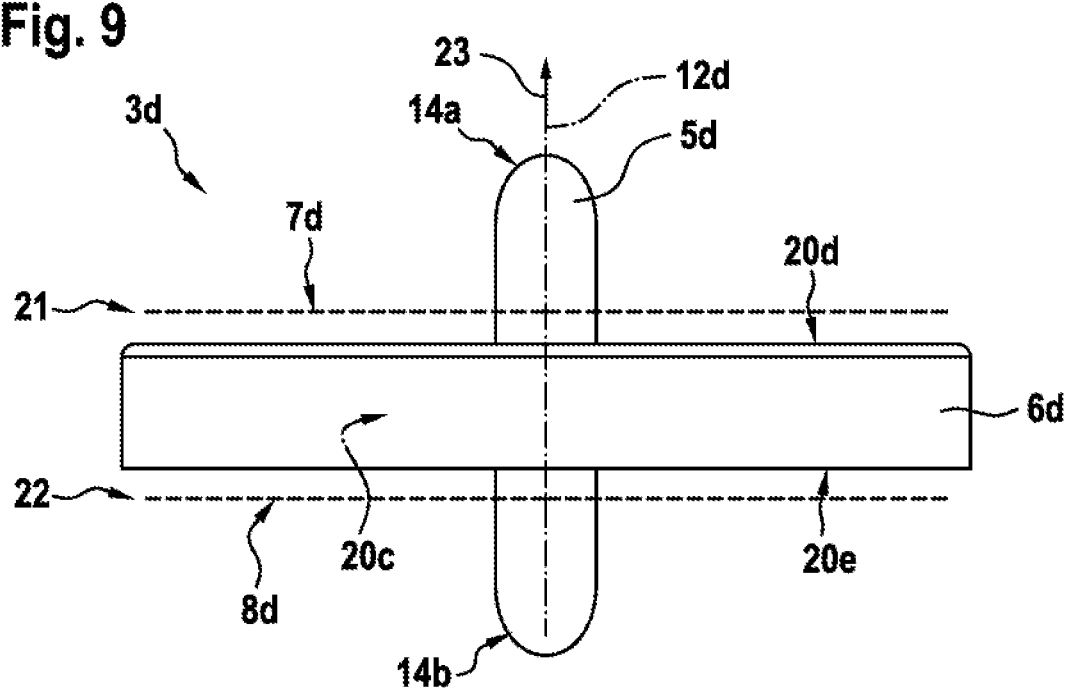
FIG. 9 shows a partly transparent side view of a thrust producing unit according to still another embodiment of the present invention.

FIG. 9 shows the thrust producing unit 3d of FIG. 7, which is configured to produce thrust in direction of the thrust vector 23 and includes at least the two rotor assemblies 7d, 8d, and the shrouding 6d, which illustratively defines the internal volume 20c, the leading edge 20d and the trailing edge 20e. Each one of the at least two rotor assemblies 7d, 8d defines its associated rotor plane 21 resp. 22. Furthermore, each one of the at least two rotor assemblies 7d, 8d defines its associated rotor axis 12d, both of which are exemplarily arranged coaxially. Moreover, the first rotor assembly 7d is arranged outside of the internal volume 20c of the shrouding 6d and faces the leading edge 20d of the shrouding 6d.

According to one aspect and in contrast to the embodiment of the thrust producing unit 3d described above with reference to FIG. 7, however, now the shrouding 6d is arranged in-between the first rotor assembly 7d and the second rotor assembly 8d without accommodating one of the first and second rotor assemblies 7d, 8d. In other words, the second rotor assembly 8d is now also arranged outside of the internal volume 20c of the shrouding 6d. Preferentially, the second rotor assembly 8d is facing the trailing edge 20e of the shrouding 6d. Furthermore, as described above, the outer diameter (20f in FIG. 8) of the shrouding 6d can be smaller than a diameter of at least one of the at least two rotor assemblies 7d, 8d.

Figure 10:
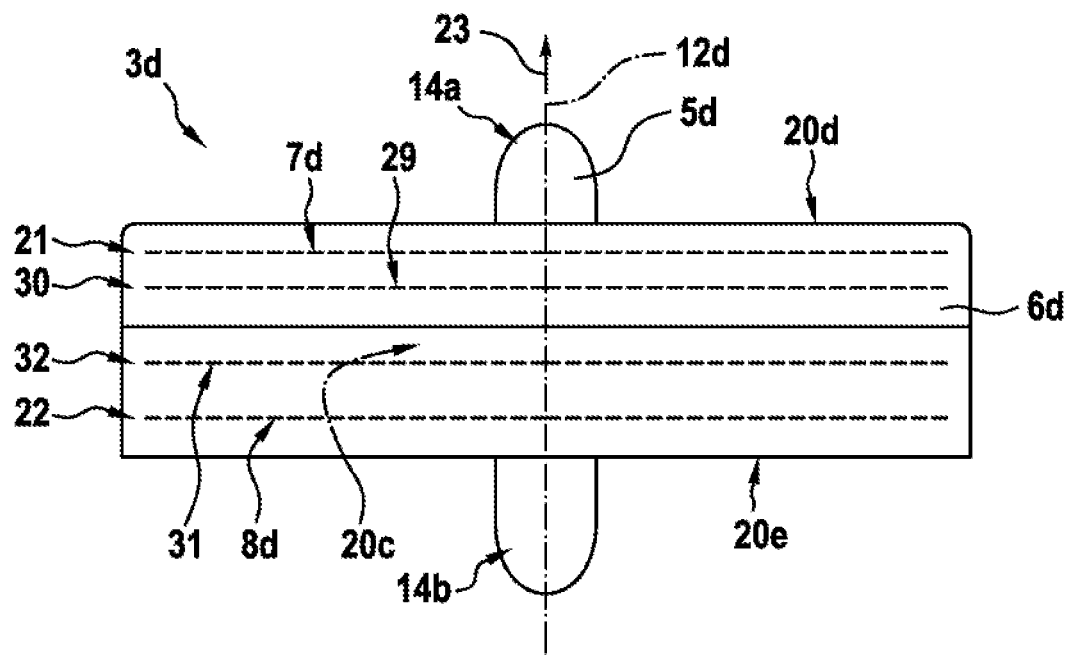
FIG. 10 shows a partly transparent side view of a thrust producing unit according to still another embodiment of the present invention.

FIG. 10 shows the thrust producing unit 3d of FIG. 8, which is configured to produce thrust in direction of the thrust vector 23 and includes at least the two rotor assemblies 7d, 8d, as well as the shrouding 6d with its associated internal volume 20c. Each one of the at least two rotor assemblies 7d, 8d defines its associated rotor plane 21 resp. 22.

According to one aspect and in contrast to the embodiment of the thrust producing unit 3d described above with reference to FIG. 8, however, now the thrust producing unit 3d further comprises at least one upper intermediate rotor assembly 29 that defines an associated rotor plane 30 and/or at least one lower intermediate rotor assembly 31 that defines an associated rotor plane 32. The associated rotor plane 30, 32 are illustratively arranged in-between the rotor planes 21, 22.

Accordingly, the at least one upper and/or lower intermediate rotor assemblies 29, 31 and the at least two rotor assemblies 7d, 8d define at least four separate rotor planes 30, 32, 21, 22. This allows to further increase a provided safety level and a satisfying flight mechanical behaviour.

It should be noted that all upper and lower rotor assemblies 7d, 29; 8d, 31 are illustratively accommodated in the shrouding 6d, i. e. inside of its internal volume 20c. However, alternatively, only the lower rotor assemblies 8d, 31 can be accommodated in the shrouding 6d, while the upper rotor assemblies 7d, 29 are accommodated in the additional shrouding 6e of FIG. 8. Still alternatively, the two rotor assemblies 7d, 8d can be arranged as illustrated in FIG. 9 outside of the shrouding 6d, while only the upper and lower intermediate rotor assemblies 29, 31 are accommodated in the shrouding 6d. Still alternatively, only the lower rotor assemblies 8d, 31 can be accommodated in the shrouding 6d, while the upper rotor assemblies 7d, 29 are arranged outside of the shrouding 6d according to FIG. 7.

Figure 11:
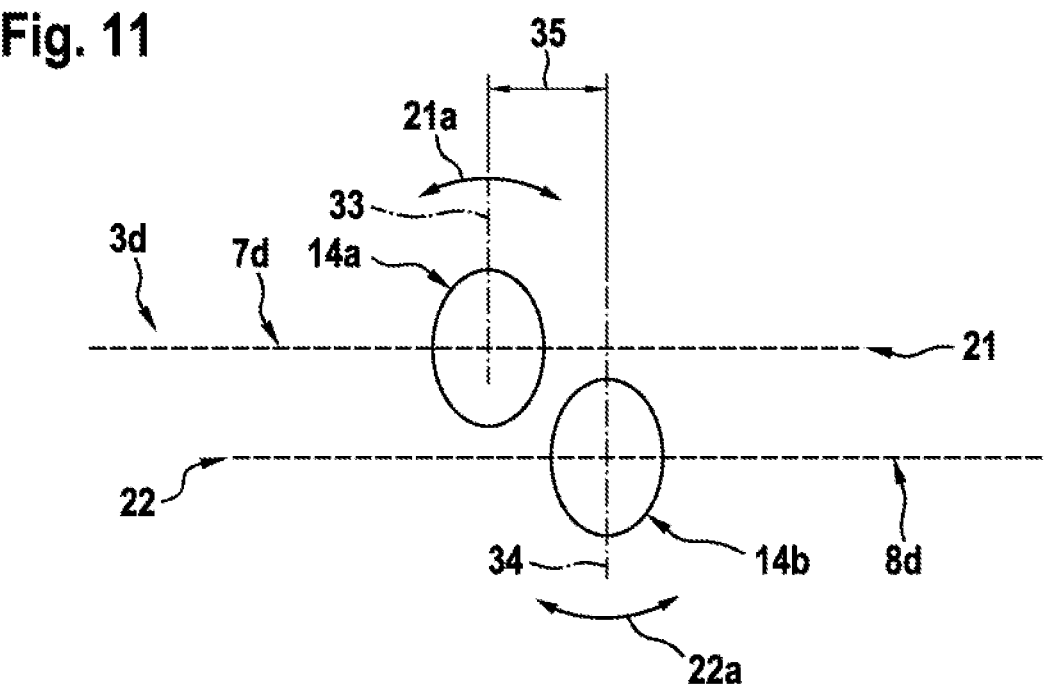
FIG. 11 shows a schematic view of a thrust producing unit according to still another embodiment of the present invention.

FIG. 11 shows a schematic view of the thrust producing unit 3d of FIG. 5 with the upper and lower rotor assemblies 7d, 8d, which preferably define the separated rotor planes 21, 22. The upper and lower rotor assemblies 7d, 8d are driven in operation by the at least one first and second engines 14a, 14b. The at least one first engine 14a is preferably adapted to rotate the upper rotor assembly 7d around a first, upper rotor axis 33 and the at least one second engine 14b is preferably adapted to rotate the lower rotor assembly 8d around a second, lower rotor axis 34.

In contrast to FIG. 5, however, the first and second rotor axes 33, 34 are spaced apart, i. e. distanced from each other by a predetermined rotor axis displacement 35. This displacement 35 can be directed in the longitudinal direction 1a of the multirotor aircraft 1 of the preceding figures and/or in its lateral direction 1b.

Figure 12:
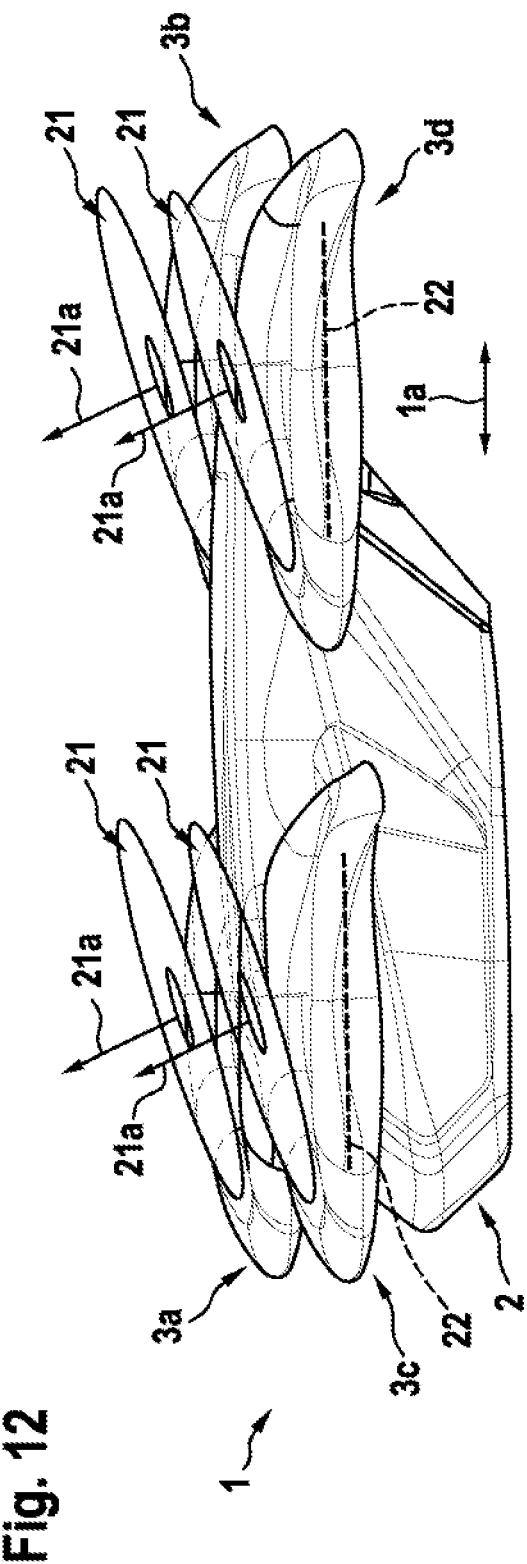
FIG. 12 shows a side perspective view of an embodiment of multirotor aircraft as per the invention, in normal flight mode.

FIG. 12 shows a side perspective view of an embodiment of multirotor aircraft 1 as per the invention, in normal flight mode. Unless otherwise stated, the references used below refer to similar elements and structures from previous embodiments.

The multirotor aircraft 1 of FIG. 12 has at least one front thrust producing unit 3a, 3c and at least one rear thrust producing unit 3b, 3d. On FIG. 12 all the at least one front and at least one rear thrust producing units 3a, 3c, 3b, 3d have at least one respective shrouding 6a, 6c, 6b, and 6d.

Illustratively, multirotor aircraft 1 has a plurality of front and rear thrust producing units 3a, 3c, 3b, 3d. Illustratively, the multirotor aircraft 1 has an equal mount of thrust producing units e.g. 3c, 3d on a star side and of thrust producing units e.g. 3a, 3b on a board side, laterally the longitudinal direction 1a of the multirotor aircraft 1.

In a given thrust producing units 3a, 3c, 3b, 3d, are provided upper and lower rotor assemblies 7d, 8d. The upper and lower rotor assemblies 7d, 8d respectively have a first rotor axis 21a and a second rotor axis 34.

On FIG. 12, the first rotor axis 21a is inclined by an associated first inclination angle 21a with respect to the predetermined direction 23 of the thrust. Illustratively, the rotor planes 21, 22 arranged on top of each other are as well inclined one relative the other, in a given thrust producing units 3a, 3c, 3b, 3d, by a complementary angle respective to the associated first inclination angle 21a.

FIG. 12 shows thrust producing units 3a, 3c, 3b, 3d each with the upper and lower rotor assemblies 7d, 8d, which define the separated rotor planes 21, 22.

FIG. 12 shows the first inclination angle 21a being longitudinal and comprised in a range between +1° and +60°. The first rotor 7d assembly is arranged outside of the internal volume of the shrouding;

The second rotor assembly 8d is arranged inside of the internal volume 20c of the corresponding shrouding 6d. Also, the second rotor assembly 8d is inclined by an associated second inclination angle 22a with respect to the predetermined direction 23. The second inclination angle 22a of FIG. 12 is in a range inferior to the range of the first inclination angle 21a.

Generally speaking, the second rotor axis 22d is inclined by an associated second inclination angle 22a with respect to the predetermined direction 23, such that the second inclination angle 22a is in a range which is inferior to the range of the first inclination angle 21a. In the embodiment of FIG. 12, with respect to the predetermined direction, the second inclination angle is null thus equals 0°.

Figure 13:
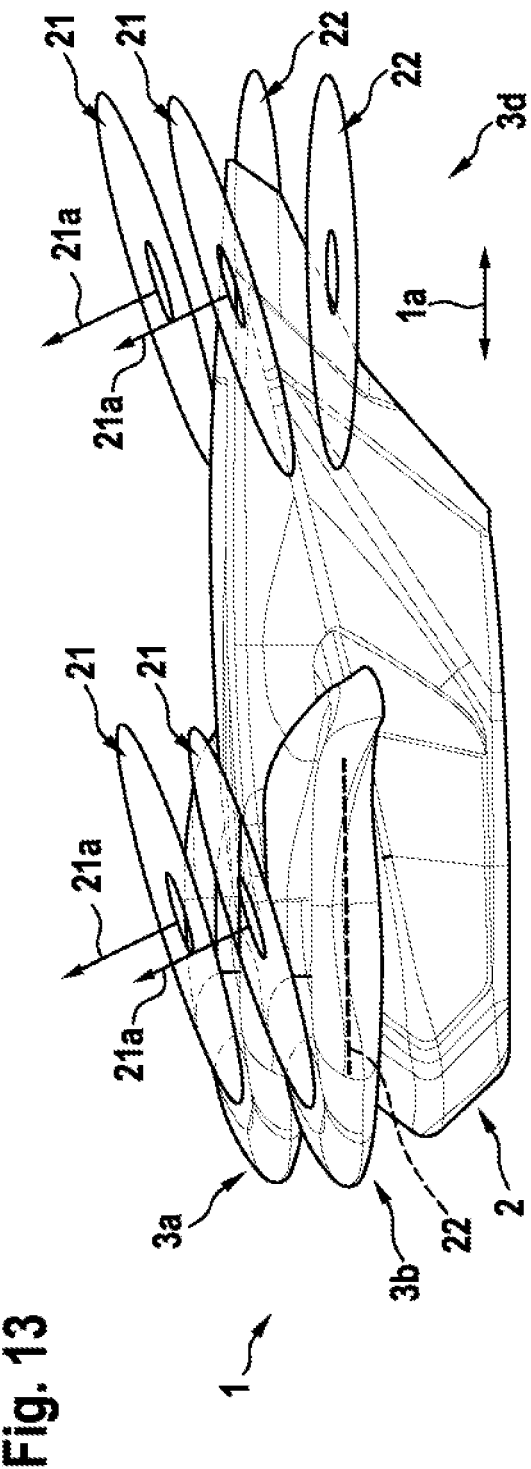
FIG. 13 shows a side perspective view of another embodiment of multirotor aircraft as per the invention, in normal flight mode.

FIG. 13 shows another embodiment of multirotor aircraft 1 as per the invention, which is slightly similar to the one of FIG. 12. Thus, unless otherwise stated, the references used below refer to similar elements and structures from previous embodiments.

The multirotor aircraft 1 of FIG. 13 has at least one front thrust producing unit 3a, 3c and at least one rear thrust producing unit 3b, 3d. On FIG. 13 only the at least one front thrust producing unit 3b, 3d has at least one respective shrouding 6b, 6d. The second rotor assembly 8d in the at least one front thrust producing unit 3b, 3d is arranged inside of the internal volume 20c of the corresponding shrouding 6d. The first rotor assembly 7d in the at least one front thrust producing unit 3b, 3d is arranged outside of the internal volume 20c.

Illustratively, multirotor aircraft 1 has a plurality of front and rear thrust producing units 3a, 3c, 3b, 3d. On FIG. 13, the multirotor aircraft 1 has an equal mount of thrust producing units e.g. 3c, 3d on a star side and of thrust producing units e.g. 3a, 3b on a board side, laterally the longitudinal direction 1a of the multirotor aircraft 1.

In this embodiment, the front thrust producing units 3b, 3d have at least one respective shrouding 6b, 6d. More remarkably, on FIG. 13, all the rear thrust producing units 3a, 3c have both upper and lower rotor assemblies 7d, 8d that are depraved of shrouding, i.e. such that both rotor planes 21, 22 of the upper and lower rotor assemblies 7d, 8d are not surrounded but by the fuselage 2a.

As per on FIG. 12, the first rotor axis 21a of all front and rear thrust producing units 3a, 3c, 3b, 3d are respectively inclined by an associated first inclination angle 21a with respect to the predetermined direction 23 of the thrust. FIG. 13 shows the first inclination angle 21a being longitudinal and comprised in a range between +1° and +60°. Also, the second rotor assembly 8d is inclined by an associated second inclination angle 22a with respect to the predetermined direction 23. The second inclination angle 22a of FIG. 13 is in a range inferior to the range of the first inclination angle 21a, for instance amounts about 0°. In the example of FIG. 12 or 13, the angular value of the first inclination angle 21a amounts for instance between 5° and 30°, preferably between 10° and 20°, more preferably about 15°, e.g. 17°.

Finally, it should be noted that modifications of the above described aspects of the present invention are also considered as being part of the claimed invention.

REFERENCE LIST

1 Multirotor aircraft
1a Aircraft longitudinal direction
1b Aircraft lateral direction
2 Aircraft airframe
2a Aircraft airframe internal volume
2b Aircraft airframe width
3 Thrust producing units
3a, 3b, 3c, 3d Thrust producing unit
4 Thrust producing units structural supports
4a, 4b, 4c, 4d Thrust producing unit structural support
5 Gearbox fairings
5a, 5b, 5c, 5d Gearbox fairing
6 Shrouding units
6a, 6b, 6c, 6d, 6e Shrouding
7 Upper rotor assemblies
7a, 7b, 7c, 7d Upper rotor assembly
8 Lower rotor assemblies
8a, 8b, 8c, 8d Lower rotor assembly
9 Thrust producing airstream direction
10 Ground
10a Vertical resp. perpendicular reference line
11 Longitudinal inclination angles
11a, 11b Longitudinal inclination angle
12 Rotor axes
12a, 12b, 12c, 12d Rotor axis
13 Lateral inclination angles
13a, 13b Lateral inclination angle
14a Upper rotor assembly engine
14b Lower rotor assembly engine
15 Upper rotor assembly rotation direction
16 Lower rotor assembly rotation direction
17 Pitch variation
18a, 18b, 18c Upper rotor assembly rotor blade
19a, 19b, 19c Lower rotor assembly rotor blade
20a Shrouding inner surface
20b Shrouding outer surface
20c Shrouding internal volume
20d Shrouding leading edge
20e Shrouding trailing edge
20f Shrouding outer diameter
21 Upper rotor assembly rotor plane
21a Upper plane inclination angle
22 Lower rotor assembly rotor plane
22a Lower plane inclination angle
23 Thrust vector
23a Airstream inflow direction
23b Airstream outflow direction
23c Free airstream flow direction
24 Distance between rotor planes
25 Upper and lower shrouding offset distance
26 Distance between leading edge and rotor plane
27a, 27b Shrouding heights
28 Rotor assembly diameter
29 Upper intermediate rotor assembly
30 Upper intermediate rotor assembly rotor plane
31 Lower intermediate rotor assembly
32 Lower intermediate rotor assembly rotor plane
33 Upper rotor assembly rotor axis
34 Lower rotor assembly rotor axis
35 Rotor axis displacement

What is claimed is:

1. A thrust producing unit for producing thrust in a predetermined direction, comprising:
a shrouding and at least two rotor assemblies, wherein the shrouding defines an internal volume, and wherein a first rotor assembly of the at least two rotor assemblies defines a first rotor axis and a second rotor assembly of the at least two rotor assemblies defines a second rotor axis,
wherein the first rotor axis is inclined by an associated first inclination angle with respect to the predetermined direction, the first inclination angle being longitudinal and in a range between +1° and +60°, and the first rotor assembly being arranged outside of the internal volume of the shrouding and above the second rotor assembly that is arranged lower than the first rotor assembly; the second rotor assembly being arranged inside of the internal volume of the shrouding;

the second rotor axis being inclined by an associated second inclination angle with respect to the predetermined direction, such that the second inclination angle is longitudinal and less than the range of the first inclination angle.

2. The thrust producing unit of claim 1, wherein the first rotor defines a first rotor plane and the second rotor assembly defines a second rotor plane and wherein D is a diameter of the second rotor assembly; and wherein a predetermined inter-planes distance between the first and second rotor planes is in a range between 0.01*D and 2*D.

3. The thrust producing unit of claim 1, wherein the shrouding comprises a leading edge and a trailing edge, wherein the first rotor assembly is adjacent the leading edge, and wherein the second rotor assembly is adjacent the trailing edge.

4. The thrust producing unit of claim 1, wherein the shrouding comprises a leading edge and a trailing edge, wherein the first rotor assembly is adjacent the leading edge.

5. The thrust producing unit of claim 1, wherein an additional shrouding is provided that accommodates the first rotor assembly.

6. The thrust producing unit of claim 5, wherein the shrouding and the additional shrouding exhibit each a height that is in a range between 0.04*D and 1*D, wherein D defines a diameter of the second rotor assembly.

7. The thrust producing unit of claim 5, wherein the shrouding and the additional shrouding are spaced apart from each other by an offset that is in a range between 0.01*D and 2*D, wherein D defines a diameter of the second rotor assembly.

8. The thrust producing unit of claim 5, wherein the additional shrouding comprises a leading edge that points away from the shrouding, wherein a predetermined leading plane distance between the leading edge and the rotor plane that is defined by the first rotor assembly is in a range between −1*D and 1*D, wherein D defines a diameter of the second rotor assembly, and wherein the first rotor assembly is arranged outside of the additional shrouding if the predetermined leading plane distance is in the range between −1*D and 0.

9. The thrust producing unit of claim 5, wherein each one of the first and second rotor assemblies defines an associated rotor plane, wherein a predetermined inter-planes distance between the associated rotor planes of the first and second rotor assemblies is in a range between 0.01*D and 2*D, wherein D defines a diameter of the second rotor assembly.

10. The thrust producing unit of claim 1, wherein each one of the first and second rotor assemblies defines an associated rotor plane, wherein a predetermined inter-planes distance between the associated rotor planes of the first and second rotor assemblies is in a range between 0.01*D and 2*D, wherein D defines a diameter of the second rotor assembly.

11. The thrust producing unit of claim 1, wherein the first rotor assembly comprises at least two rotor blades and the second rotor assembly comprises at least two rotor blades.

12. The thrust producing unit of claim 1, wherein the first rotor assembly is adapted to be rotated in a first rotation direction in operation and the second rotor assembly is adapted to be rotated in a second rotation direction in operation.

13. The thrust producing unit of claim 1, wherein the second inclination angle is generally equal to 0°.

14. A multirotor aircraft comprising at least one thrust producing unit that is configured according to claim 1.

15. A thrust producing unit for an aircraft comprising:

a shrouding defining an internal volume;

a first rotor assembly disposed above the shrouding and having a first rotor axis being oriented at a first inclination angle with relative to a longitudinal direction, the first inclination angle in a range between +1° and +60°; and a second rotor assembly disposed below the first rotor assembly inside the internal volume of the shrouding, the second rotor assembly having a second rotor axis oriented at a second inclination angle relative to the longitudinal axis being less than the range of the first inclination angle.

16. The thrust producing unit of claim 15, wherein the second inclination angle is generally equal to 0°.

17. The thrust producing unit of claim 15, wherein the first rotor defines a first rotor plane and the second rotor assembly defines a second rotor plane and wherein D is a diameter of the second rotor assembly; and wherein a predetermined inter-planes distance between the first and second rotor planes is in a range between 0.01*D and 2*D.

18. The thrust producing unit of claim 15, wherein the shrouding comprises a leading edge and a trailing edge, wherein the first rotor assembly is adjacent the leading edge, and wherein the second rotor assembly is adjacent the trailing edge.

* * * * *